United States Patent Office 2,779,233
Patented Jan. 29, 1957

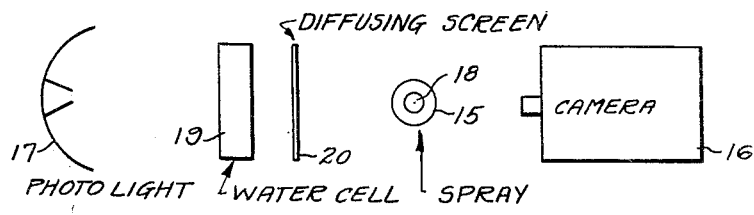
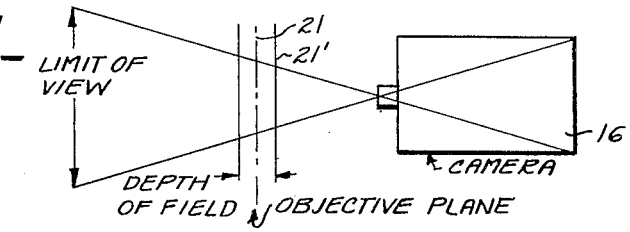
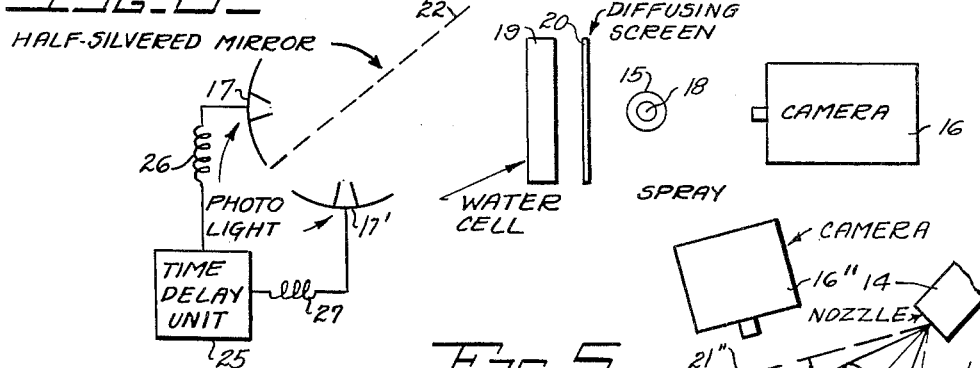
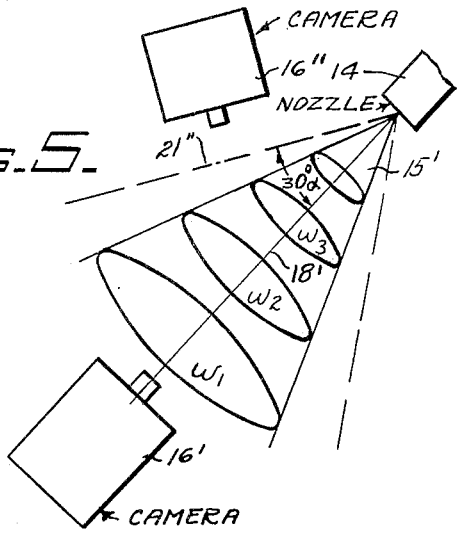
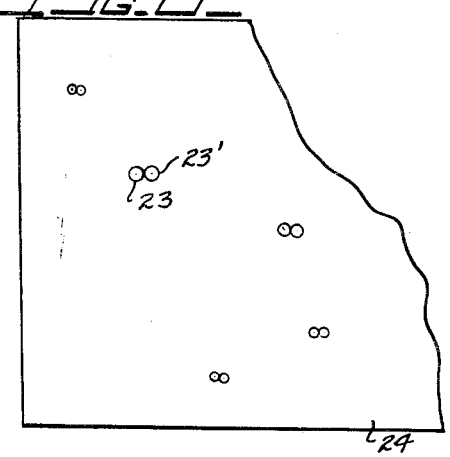

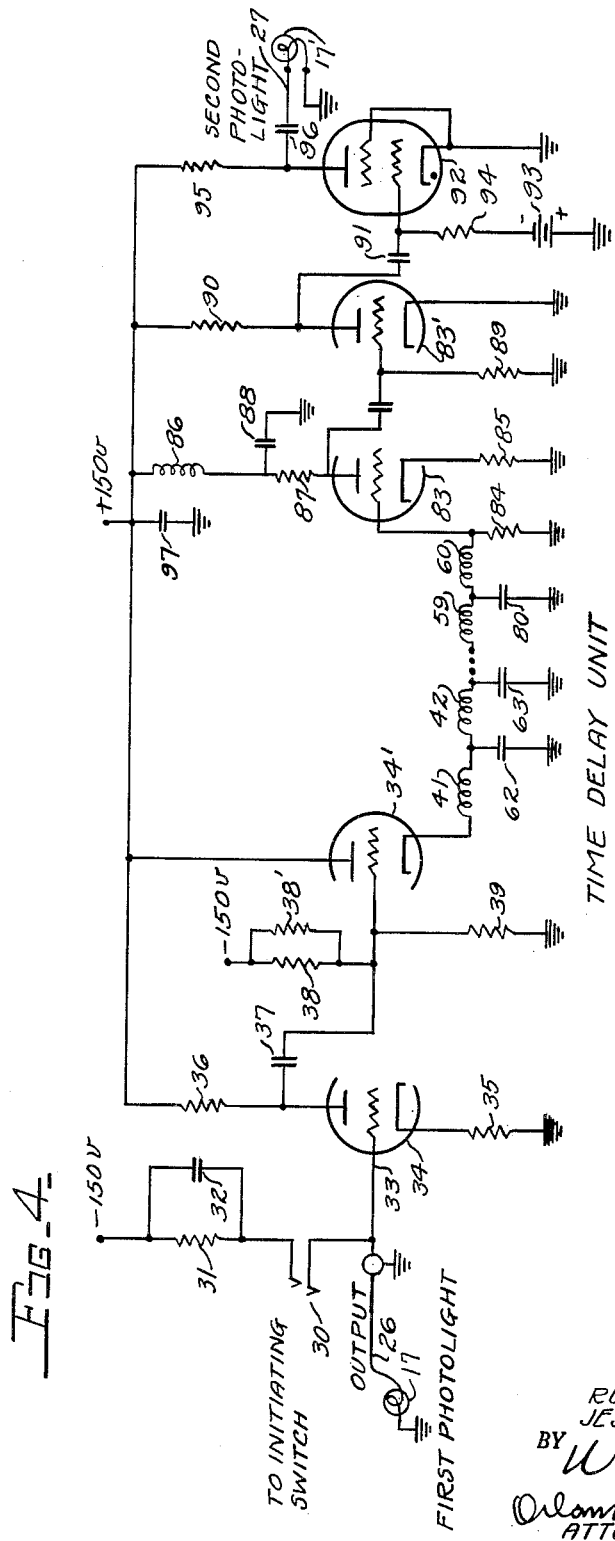

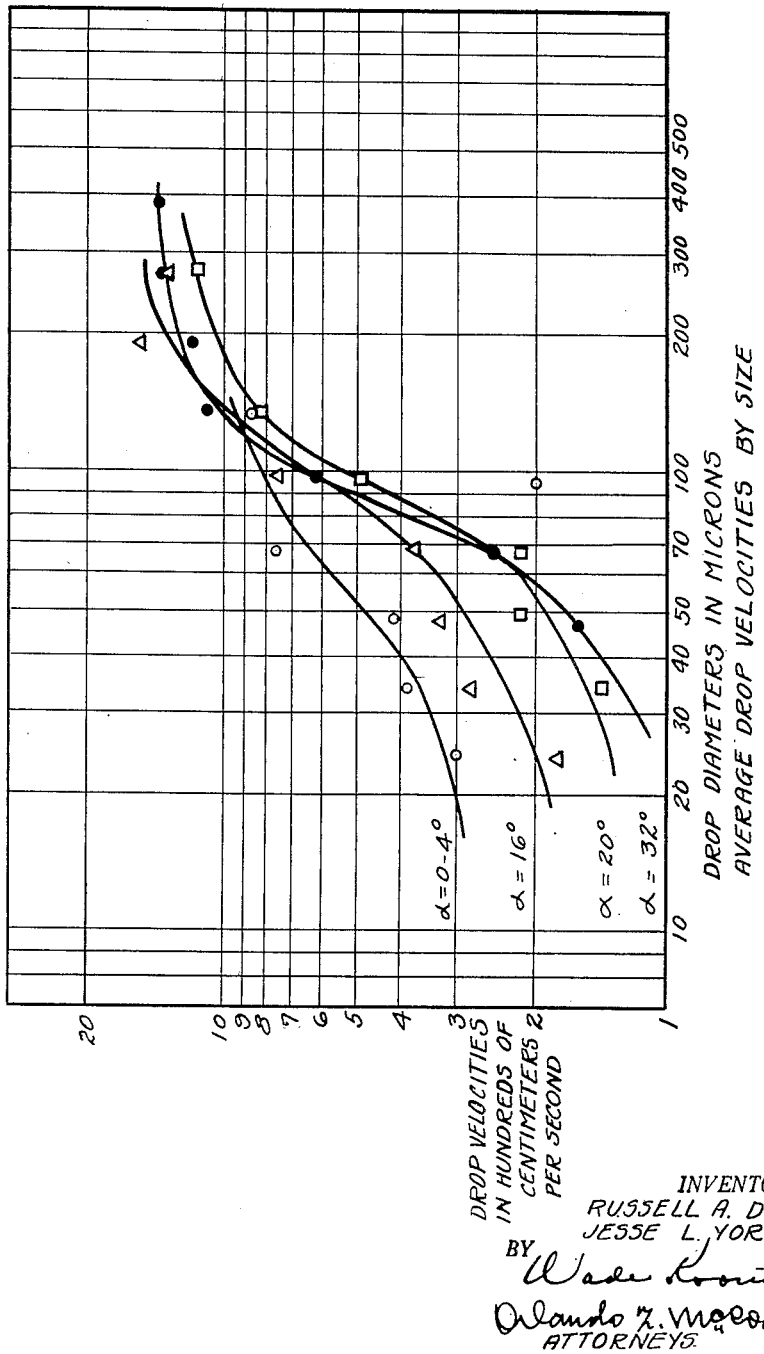

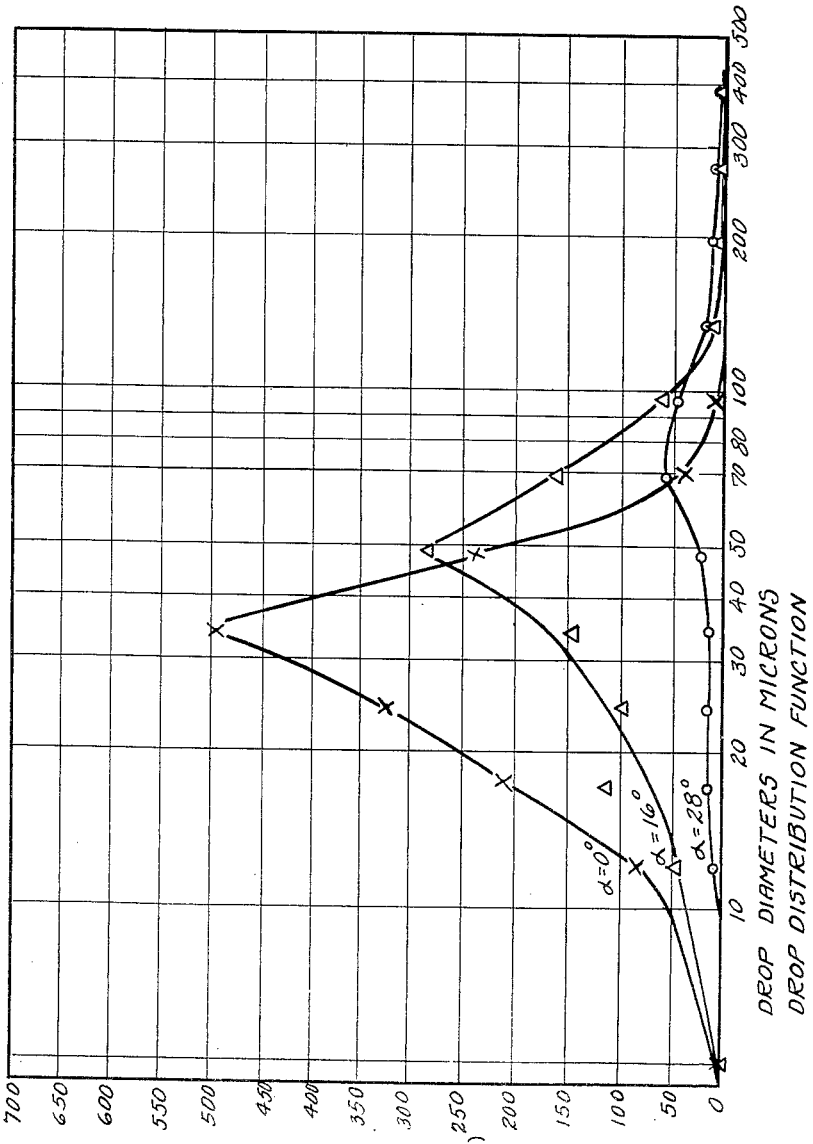

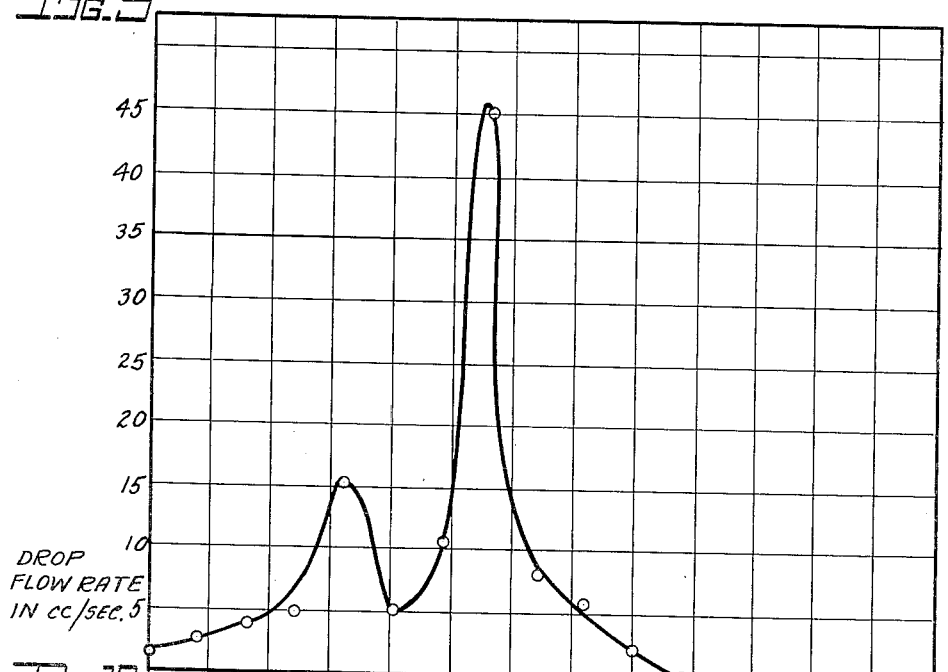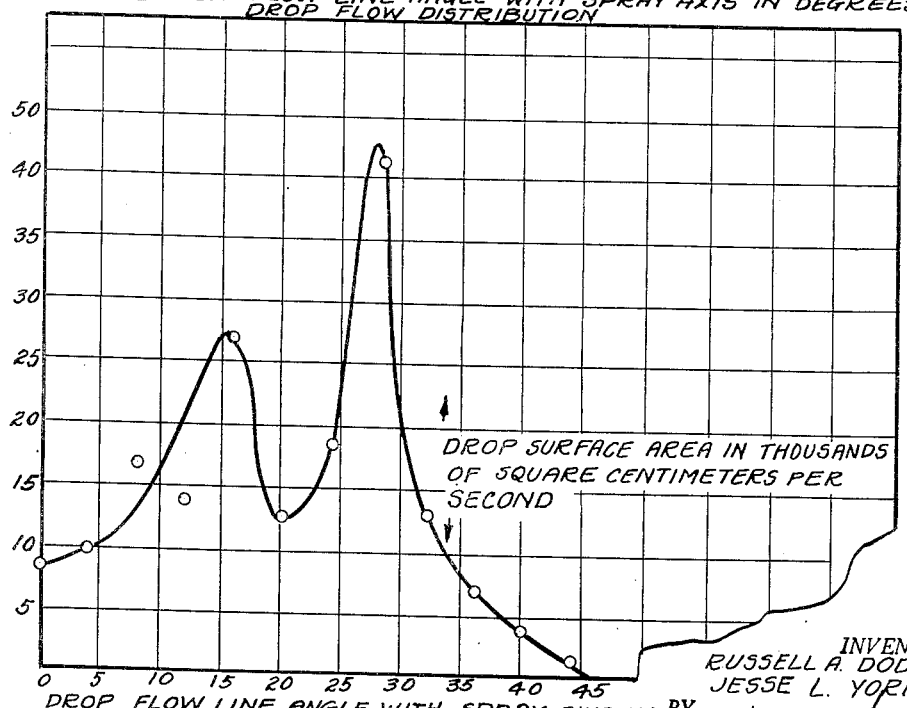

2,779,233

PHOTOGRAPHIC ANALYSIS OF SPRAYS

Russell A. Dodge and Jesse L. York, Ann Arbor, Mich., assignors to the United States of America as represented by the Secretary of the Air Force Application August 7, 1953, Serial No. 373,078

2 Claims. (Cl. 88—14)

This invention relates to spray analysis and more particularly to a photographic method for acquiring data on spray performance and characteristics.

In the past study of sprays, their properties of drop dimensions, densities, and velocities have been difficult of evaluation and reproduction because of the lack of adequate equipment and techniques. Attempts to evaluate the characteristics of a spray have included cups, spoons and tubes inserted into the spray for entrapping and removing a measurable content therefrom. All of these entrapment methods distort the spray from its normal pattern. Analysis by light scattering avoids the limitations of the physical impinging of a liquid upon a solid but suffers limitations from disparities in drop dimensions.

The present approach to spray analysis is photographic. It is not biased by physical sampling and it is susceptible to direct interpretation in terms of the numbers, sizes, and velocities of the particles or droplets in a photographed sample objective plane of the spray.

An object of the present invention is to provide a photographic procedure for spray analysis without altering the flow pattern of the spray.

Another object is to provide permanent records of reproducible spray sampling analysis on film or photographic plates from which may be made determinations of drop spatial distributions, or the numbers of drops classified by size in a unit area; and the numbers of drops classified by size in a unit volume; the temporal distribution or the drop velocities by size; and the drop distribution by drop flow line angle with respect to the axis of a spray, such for example as a conical spray.

Another object is to provide an experimental technique applicable to the study of sprays wherein the particles or drops illustratively are within the size range of diameters up to 500 microns and a technique that yields estimated results that conform to within 20% of the total liquid metered through the spray nozzle.

With the above and other objects in view that will be apparent hereinafter illustrative embodiments of the present invention are shown in the accompanying drawings wherein:

Fig. 1 is a diagrammatic sketch indicating an arrangement for practicing the present invention;

Fig. 2 is a diagrammatic sketch indicating a preferred method of sampling a spray with a camera focused on an objective field in the spray;

Fig. 3 is a modification in the arrangement of Fig. 1 adapted for the use of a pair of light flashes separated by a very short time interval;

Fig. 4 is a schematic electrical diagram of an experimentally successful time delay unit indicated by a block diagram in Fig. 3;

Fig. 5 is a diagram of modifications in the arrangements wherein a conical spray also may be directed toward the camera;

Fig. 6 is a fragmentary sketch of a photograph of a spray objective plane producible by the use of the equipments and arrangements in Fig. 3;

Fig. 7 is an experimentally determined graph using the uppermost arrangement in Fig. 5 with the camera optical axis normal to its objective plane which makes an angle alpha of illustratively 30° with the axis of a hollow conical spray from which the data was gathered to provide the four curves shown of the average drop velocity by size in terms of drop diameters in microns along the abscissa of the graph and drop velocities in centimeters per second along the ordinate of the graph;

Fig. 8 is a graph of the distribution function of drops within a spray in terms of drop diameters along the abscissa and a mathematical function $f$ along the ordinate, with the objective plane of the camera making an angle alpha with the spray axis;

Fig. 9 is a graph showing drop flow distribution within a spray, with the drop flow line angle with the spray axis expressed in degrees along the abscissa and with the drop flow rate of the spray in cubic centimeters per second along the ordinate; and Fig. 10 is a graph showing drop surface distribution in the spray with the drop flow line angle with the spray axis along the abscissa and with the drop surface area in square centimeters per second along the ordinate.

In Figs. 1 and 3 of the accompanying drawings the camera is represented as having its line of sight or optical axis normal to the axis of a conical spray.

Fig. 5 illustrates two spray-camera arrangements wherein the cameras remain in positions and the spray is moved during the taking of a series of photographs. The camera 16' has its optical axis coincident with the spray axis 18' and its objective plane at successive surfaces omega. The camera 16" has its objectible plane 21" fixed in position during the taking of a series of photographs at different angles with the spray axis as the nozzle 14 is moved to the side around its orifice as center of rotation.

In Fig. 1 the spray 15 that is to be analyzed is directed past and in front of the lens of a camera 16, and preferably with an illumination or light source 17 on the opposite side of the spray from the camera, such that the drops in the spray 15 are illuminated with transmitted rather than with reflected light. In the illustrative diagrams of Figs. 1 and 3 the spray axis 18 is substantially normal to the optical axis of the camera 16. With this arrangement the drops of liquid in the spray 15 appear in silhouette on pictures made by the camera 16. Silhouette lighting also is preferred for the arrangement in Fig. 5. A preferred illumination is by a General Electric photo-light, catalogue 9,364,688G1. Light from the light source 17 is conducted through a water cell 19, a diffusing screen 20 and the spray 15 before it arrives at the camera 16. The water cell 19, in harmony with common practice, is a rectangular basin with parallel sides that are optically transparent. The diffusing screen 20 is a mat glass, a glass with a ground surface or the like. The intensity of the illumination may be modified to a desired degree by the introduction of a suitable neutral light filter, of which nigrosin is an example. Nigrosin is water soluble and is a convenient additive to the water in the water cell 19 to a desired degree of opacity.

Within the scope of the present invention the camera optical axis may be directed to make any desired angle with the axis of the spray 15. The spray 15 may be conical, cylindrical, more or less spherical or of other contour and it may be of uniform density of drop distribution, or it may be hollow as found among commercial sprays. The drop silhouette may be intensified, where desired, by increasing to a preferred degree the light absorption by the liquid of the spray 15. The neutral density filter that may be used includes gelatin filters, such as filters marketed by the Eastman Kodak Company as a neutral filter that functions in the absorption of light energy with no partiality as to the wave length of any particular color in the light energy.

A desired neutral filter density illustratively may be measured for a particular part of the spray 15 and for a particular illumination thereof by substituting an incandescent light for the photo-light 17 and by placing a photoelectric cell at the plane of the film or plate in the camera 16. With this arrangement the light from the incandescent lamp passes through the water cell 19 and the diffusing screen 20 and causes the photo electric cell at the camera plate location to modify its electrical potential to a measurable extent. The output from the photo electric cell is a measure of light passing through the system and arriving at the plane of the camera film or plate. This procedure permits the calibration of the light systems for the arrangements in Figs. 1, 3 and 5. The incandescent lamp replaces the photo-light because the photo-light is of too high an intensity and of too short a duration to provide a reading on the photo electric cell. The diffusion screen 20 assists in imparting uniformity with the light arriving at the plane of the camera film plate.

The spray 15 commonly is conical and is so contemplated in the accompanying drawings. In the making of pictures of the spray for a study of the spatial distribution of drops or other particles in the spray, the camera is focused on a particular spray area, the shutter is closed and the plate or film pack is introduced into the back of the camera and the pack cover is withdrawn. The room is then darkened and the camera shutter is opened. The length of exposure is controlled by the length of time the illumination is applied through the spray and into the camera. On the discontinuance of the illumination the camera shutter is closed, the plate pack cover is replaced, the plate pack is removed and the plate or film is developed.

The spatial distribution of moving drops in the spray 15 is best shown by a short time illumination to minimize drop displacement on the camera plate. Illustratively the General Electric photolight strikes an arc of a millionth of a second duration on the discharge of a capacitor and is well adapted for use in determining drop distribution in the spray 15.

In Fig. 2 of the accompanying drawings is indicated an objective plane 21 in a depth of field 21' in which objective plane the camera is most accurately focused.

The presence of spray particles or drops in the objective plane 21 indicated in Fig. 2 or in close proximity thereto is indicated by the sharpness or definition of the drop images on the developed plate. The drop image quality of definition is based on the resolution of the drop images and how clearly distinct from each other they appear to be by sharpness of outline and clearness of image.

The establishing of a satisfactory objective plane 21 for various sections of the spray from which an estimate may be made of the characteristics of interest in the spray also is accomplished illustratively by maintaining the camera in a fixed position with its optical axis initially normal to the spray cone axis and by moving the nozzle to the side about its orifice as center of rotation in small angle steps with a photographic exposure at each step. With a common conical spray, as of fuel oil or gasoline, the camera may be placed with its optical axis or line of sight normal to the axis of the spray and spaced sufficiently in front of the nozzle orifice for the camera field of view in all exposures to establish a predetermined relation with the nozzle orifice for standardization of relative position among exposures.

For an 80° cone with peripheral spray drop flow lines making an angle of 40° with a cone axis, then 10 exposures at 4° increments, as the nozzle is moved laterally in a plane about its orifice as center of rotation with the spray cone axis 18' moving away from the camera 16" four degrees with each exposure, the resulting 10 pictures will all have been taken of the same objective plane of the original cone axis position. The resulting pictures are of sections of the cone from its axis to its periphery, or the reverse as preferred, in each of which pictures illustrative drops are within the same objective plane 21" of the same camera 16''' and are so identified by their distinctness, clarity and sharp delineation from other drops that relatively are out of focus, as indicated by fuzzy, obscure outlines and indefiniteness.

In Fig. 5 of the drawings, as other illustrative procedures, the optical axis of the camera 16' is coincident with and the camera objective plane is normal to the spray cone axis 18' and a succession of pictures may be taken with the camera objective plane 21 increasingly near the orifice of the nozzle 14, or the reverse, to provide a plurality of pictures, one for each surface of a solid angle omega ($w$) with its apex at the nozzle orifice such that $w_1 = w_2 = w_3$ etc. With a conical spray of uniform drop distribution directed from the orifice of the movable nozzle 14, the camera objective plane 21 will be normal to the spray axis in all positions outwardly from the spray orifice and a desired number of exposures of the spray in circular pattern and of decreasing density away from the orifice in the nozzle may be made using transmitted, reflected or refracted light for illumination, as preferred. Within the scope of this invention, the nozzle 14 or the camera 16' may be successively moved laterally outwardly from the cone axis 18' for successive exposures of spray conical layer densities until the camera optical axis arrives at the periphery of the spray.

Different nozzle systems may be compared successfully in their performance by these described procedures.

From the pictures so taken the characteristics of sprays are reduced substantially to compartive spray drop distributions. This procedure serves to compare the performance of different nozzles, different liquids from the same nozzle and related experimental studies of sprays whether actually photographed or merely observed.

Where preferred, drop image standardization may be assisted by the use of previously prepared plates of glass fibres having diameters comparable in size and appearance on the plate with those of the drops in the spray for comparison with pictures of the sprays.

The drop spatial distribution on a particular film or plate resulting from the practice disclosed herein, such as the film 24 in Fig. 6 of the drawing, for example, may be viewed satisfactorily in a commercially available bench comparator for projection on a mat or ground glass screen. In the event the camera dimensions are such as to provide a negative bearing drop images 23 magnified to 10 diameters and the bench comparator projection is such as to increase the size of the images another 10 fold then the images to be compared, classified by size and tabulated will be 100 times as large as are the particle or drop objects in the spray. The spatial drop distribution in the spray is then arrived at by the adoption of an empirical plurality of classes or drops of different sizes, counting the prevalence of drops of each size per unit area in the objective plane of the optical system from which the particular negative being worked on resulted. In the above described manner is accomplished estimates for a particular spray or drop spatial distribution by graduated size drops from sections of the spray between its axis and its periphery or axially of the spray. For purposes of comparison between sprays and among nozzles these results may be standardized on the basis of a prescribed size surface as a basis for comparison in a two dimensional plane and as a prescribed steradian solid angle as a comparative unit of volume. This procedure also affords a quantitative measure in a particular spray on the basis of size distribution of drops or small particles in a solid steradian angle.

Investigation of the temporal distribution of drops based on the distribution of drops by size passing across sectional areas of the spray in a unit time requires an investigation of drop velocities, the temporal distribution being taken as the product of the spatial distribution and the average velocity of drops of each size in the spray being investigated.

Estimates of drop velocities are arrived at photographically by the taking of double exposures of the same region in a spray with small standardized time intervals between successive exposures. The resultant photographs show pairs of images of each drop, one image for each exposure, as the images 23 and 23' of Fig. 6, with the images of each pair separated by a distance depending on the velocity of the drop object from which the images are made during the short time interval between exposures. The distance between a pair of drop images divided by the time interval between the exposures providing the pair of drop images is drop velocity information. This information is of use in computing the temporal distribution of drops of the size images under comparison for that particular pair of drop images.

A diagram for the determination of the temporal drop distribution in a spray is shown in Fig. 3 of the accompanying drawings. In Fig. 3 are two light sources, such as the photo lights 17 and 17', that supply light from the same direction by their application to a beam splitter, of which the partially silvered mirror 22 is illustrative. The two photo lights 17 and 17' are successively energized a short time interval apart, with light energy from the photolight 17 passing through the partly silvered mirror 22 and intervening watercell 19, screen 20 and spray 15 to the camera 16 and with light energy from the photo light 17' reflected by the partially silvered mirror 22 and similarly to the camera 16. In this manner a single drop in the spray 15 has its image recorded in the open shutter camera 16, as the drop 23 in Fig. 6, with the flashing of the first light 17 and then moves under its velocity to another position in space where the second image 23' is recorded with the flashing of the second light 17'. The distance between the two images 23 and 23' of the same drop on the processed plate or film 24 of the camera 16 is the distance traveled by that drop in the short time period between the successive flashes of the lights 17 and 17'. The time interval between the successive illuminations of the spray 15 from the lights 17 and 17' is accomplished in any desired manner, as by a time delay unit 25 that is connected through leads 26 and 27, respectively, in Fig. 3, to the lights and is shown in a schematic electrical diagram in Fig. 4 of the drawings.

The time interval between flashes must be less than the recovery time of a single photo light and hence two photo lights are used. The exact length of the time interval is not critical but it must be reproducible. The time delay is spaced so that the association of the two images as having originated from a single drop is definite. Experimentally a time delay of 25 microseconds with drops moving 20 feet per second has proven to be satisfactory.

The calibration of the time delay unit 25 may be and has been successfully accomplished experimentally by replacing the spray 15 in Fig. 3 with the teeth of a circular saw rotating at a known rate. By measuring the angular velocity of the saw and the distance a saw tooth travels between exposures, the time interval between flashes can be calculated with dependable accuracy. This calibration method was proven adequate by experimental determinations.

The negatives with the developed exposure of drops are placed in the comparator and the displacement of pairs of drop images rated according to their sizes are measured and are made of record. The lists of displacements of drop images for each drop size are then reduced to a mean value and from these averages are calculated the drop velocities of the drops of different sizes in the spray. The product of the spatial distribution and the average velocity of the spray drops classified by size then gives the temporal distribution by size of the drops in the spray from which the data was recorded. It is significant that with this procedure the results differ by less than 20% from the metered values of the total liquid flow through the nozzle that provides the spray. These determinations may be applied selectively at different locations in a spray for further experimentation and analysis of spray characteristics. Figs. 7 to 10 of the accompanying drawings are experimental determinations made in the exercise of the invention that is described herein.

A schematic electrical diagram of an electrical circuit suitable for use as the time delay unit 25 of Fig. 3 is shown in Fig. 4 of the drawings. In Fig. 4, the closing of an initiating switch 30 fires the first photo light 17 by applying an indicated potential of 150 volts across its terminals and shortly thereafter fires the second photo light 17'. The circuit between the photo lights substantially is a delay line with multiple stage amplifiers at both ends thereof. The closing of the switch 30 applies a pulse of minus 150 volts through a capacitor 32 shunted by a resistor 31 to the grid 33 of the left hand side 34 of a duo triode tube 34, 34'. The cathode of the tube side 34 is returned to ground through a resistor 35. The anode of the tube side 34 is supplied through a plate resistor 36 with +150 volts plate potential and is coupled through a capacitor 37 with the grid electrode of the right hand duo triode tube side 34'. The grid of the duo triode tube side 34' has a bias supply of −150 volts supplied to it through a resistor represented in the circuit by the parallel connected resistors 38 and 38' and is connected to ground through another resistor 39. The anode electrode of the duo triode tube side 34' has a plate voltage of +150 volts applied to it directly.

Output from the duo triode tube side 34' is taken from its cathode electrode and is applied to a suitable delay line filter that illustratively may comprise twenty coils 41, 42 . . . 60, the junctions of pairs of which are connected to ground through capacitors 62, 63 . . . 80. Output from the delay line 41 to 80, inclusive, is passed to the grid electrode of the left hand side 83 of a second duo triode 83, 83'. The grid of the tube side 83 is grounded through a non-pulse reflecting delay line terminating resistor 84. The cathode electrode of the tube side 83 is applied to ground through a resistor 85. The anode electrode of the tube side 83 has a plate potential of +150 volts applied to it through a choke 86 in series with a resistor 87 with their junction connected through a capacitor 88 to ground. The choke 86 and capacitor 88 prevent the timing pulse from re-entering the other circuits.

The plate electrode of the duo-triode tube side 83 is capacitively coupled with the grid of the right hand tube side 83'. The grid of the tube side 83' is connected to ground through a resistor 89. The cathode of the tube side 83' is connected directly to ground. A plate potential of +150 volts is supplied through resistor 90 to the plate electrode of the tube side 83'.

Output from the duo-triode tube side 83' is taken from its plate through a coupling capacitor 91 and is passed to the grid electrode of a gas filled tetrode 92. Grid bias of a predetermined potential is supplied from a direct current source 93 through a grid resistor 94 to the control grid of the gas tube 92. Both the cathode electrode and the number two grid of the gas tube 92 are connected directly to ground. A plus 150 volt plate potential is supplied through resistor 95 to the plate electrode of the gas tube 92. The pulse output from the plate of the gas tube 92 is passed through the capacitor 96 and serves to flash the second photo light 17' a reproducible time delay after the flashing of the first photo light 17, as determined by the intervening circuitry. Another capacitor 97 connected to the plate potential of +150 volts passes spurious alternating current disturbances to ground.

The resultant flashes of light from the photo lights 17 and 17' provide on the finished plate or film 24 the pair of images 23 and 23' previously referred to in connection with Fig. 3 of the drawings. From the described procedure applied to the assembly in Fig. 5 of the drawings, the graphs in Figs. 7 to 10, inclusive, have been obtained experimentally.

Fig. 7 is a four curve graph of points of average spray drop velocities by size in a hollow conical spray and camera assembly in Fig. 1 and 16" of Fig. 5. The spray drop performance is expressed in terms of drop diameter along the abscissa and spray drop velocities along the ordinate, in terms of four different angles alpha (a) between the spray axis and the camera objective plane 21 in Fig. 2 and 21" in Fig. 5 of the camera. Experimentally the center of the camera lens was about six inches from the discharge orifice of the spray nozzle 14. The four curves shown indicate the general observation that with a camera objective plane within four degrees of being coincident with the spray axis, the drops of the spray of 20 microns diameter, below which diameter no experimental measurements have been made in this experimentation have a velocity of roughly 300 centimeters per second, whereas drops of 30 microns diameter, near the spray periphery with the camera objective plane making an angle alpha of 32° to the spray axis have a velocity of roughly 100 centimeters per second. The four curves show further that in the spray tested, spray drops of 150 microns in diameter had a velocity of about 8 or 9 hundred centimeters per second for all four angles alpha between the camera objective plane and the axis of the conical spray.

Fig. 8 is a graph of points of spray drop performance with the camera 16" positioned as shown in Fig. 5. The series of pictures taken were with the angle alpha coincident with the cone axis for one curve and up to 28° with respect to the cone axis for the maximum angle alpha. The graph presents a drop distribution function expressed in terms of drop diameters along the abscissa and a mathematical function "f" along the ordinate. The function f is the number of drops per centimeter of diameter range, moving through a steradian angle diverging from the nozzle orifice, and created from one cubic centimeter of fluid issuing from the nozzle orifice. The function "f" is defined as $$f = \frac{1}{q} \lim \frac{n}{\Delta x w}$$

wherein $q$ is cubic centimeters of fluid sprayed through the nozzle; $n$ is the number of drops having a diameter size range in microns of $x$ as the lower limit and $\Delta x$ as the range between the lower and upper limits; and omega ($w$) is the solid angle expressed in steradians with its apex at the nozzle orifice through which the drops pass. The integration of the function "f" over all drop sizes and all solid angles of a conical spray gives "f" as the total number of drops per cc. of total sprayed fluid. The curves of Fig. 8 indicate roughly that for the nozzle and pressures experimented with, a more uniform dropsize distribution exists at the periphery than inwardly of the spray cone.

Fig. 9 is a graph of the drop flow distribution in a spray with the angles made by the drop flow line with the spray axis along the abscissa and the drop flow rate along the ordinate. The curve indicates that the drop flow lines predominately make angles between 25 and 30 degrees with the spray cone axis, indicating that the spray from which the data was gathered was a hollow cone.

The graph of Fig. 10 is a curve of the drop flow line angle with the spray axis along the abscissa and the drop surface area or liquid-air interface along the ordinate. The curve of Fig. 10 indicates that the maximum drop surface area is exposed by drops following flow lines making angles between 25 and 30° with the cone axis.

It is to be understood that the equipment association and use and the methods disclosed in the system of photographic spray analysis that is shown and described herein have been submitted as being illustrative of an operative embodiment of the present invention and that similarly operating modifications and substitutions therein may be made without departing from the scope of the present invention.

What we claim is:

1. A spray analyzing device, comprising a nozzle apertured to provide a spray of finely divided particles moving through air and which nozzle is movable about the nozzle aperture as center of rotation, a first light source illuminating some of the particles sprayed from the nozzle aperture whereby the particles may be illuminated for being recorded on a photo sensitive means, photo sensitive means making of record the illuminated particle distribution in the air with the nozzle in a first position, a second light source illuminating some of the same particles made of record on said photo sensitive means whereby the same previously recorded particles may be illuminated for being recorded on the same photo sensitive means whereby the particle displacement during the time delay between the two illuminations is apparent on the same photo sensitive means, and a time delay circuit means establishing the time interval between the making of record of the particle distribution in the air and which time delay means comprises amplifying tubes at opposite ends of and separated by a plurality of inductors separately capacitively passed to ground for delaying the energization of the second light source.

2. The device defined in claim 1 inclusive of a first and a second light providing the first and second light sources whereby particles in the spray are illuminated for the purpose of being recorded spatially on the photo sensitive means and with the time delay means comprising an initiating switch whereby the time delay means is energized, a first amplifier circuit having a first amplifier stage tube grid electrode connected through said first light to ground and having a plate electrode from which output is taken, a grid bias supply of sufficient amplitude to energize said first light on the closing of the initiating switch and supplying a pulse to the first amplifier stage tube grid electrode and to cause the first amplifier circuit stage to conduct, a first amplifier circuit second amplifier stage tube driven to conduction by output from the first amplifier stage plate electrode output and having a cathode electrode from which the output from the first amplifier circuit is derived, a filter delay line supplied its input from the cathode electrode of the first amplifier circuit second amplifier stage tube, and a second amplifier circuit having an output energizing the second light a time interval after the energization of said first light as a result of the closing of the initiating switch whereby particles within the spray are illuminated for the purpose of being recorded spacially on the photo sensitive means in positions displaced from their positions when they were recorded by the first light.

References Cited in the file of this patent
UNITED STATES PATENTS

| 1,897,111 | Corbett et al. | Feb. 14, 1933 |
| 2,488,868 | Kaplan | Nov. 22, 1949 |

OTHER REFERENCES

Eyles, E. D.: "Some Applications of High Speed Photography," in The Photographic Journal, July 1943, pages 261–265.